US008255259B2

(12) United States Patent
Connors et al.

(10) Patent No.: US 8,255,259 B2
(45) Date of Patent: Aug. 28, 2012

(54) EXTENDING CONSTRAINT SATISFACTION PROBLEM SOLVING

(75) Inventors: Daniel Patrick Connors, Pleasant Valley, NY (US); Donna Leigh Gresh, Cortlandt Manor, NY (US); Yehuda Naveh, Haifa (IL); Yossi Richter, Kfar Saba (IL)

(73) Assignee: International Business Machines Corporation, Armonk, NY (US)

( * ) Notice: Subject to any disclaimer, the term of this patent is extended or adjusted under 35 U.S.C. 154(b) by 803 days.

(21) Appl. No.: 12/343,539

(22) Filed: Dec. 24, 2008

(65) Prior Publication Data

US 2010/0161373 A1      Jun. 24, 2010

(51) Int. Cl.
    *G06Q 10/00*    (2006.01)
(52) U.S. Cl. ............... 705/7.25; 705/7.11; 705/7.12; 705/7.13; 705/7.14; 705/7.17; 705/7.21
(58) Field of Classification Search ............... 705/7.11
    See application file for complete search history.

(56) References Cited

U.S. PATENT DOCUMENTS

| | | | | |
|---|---|---|---|---|
| 5,461,699 | A  * | 10/1995 | Arbabi et al. | 706/21 |
| 6,031,984 | A  * | 2/2000  | Walser | 703/2 |
| 6,993,458 | B1 * | 1/2006  | Castelli et al. | 702/186 |
| 2001/0043613 | A1 * | 11/2001 | Wibowo et al. | 370/468 |
| 2003/0023719 | A1 * | 1/2003  | Castelli et al. | 709/224 |
| 2004/0059549 | A1 * | 3/2004  | Kropaczek et al. | 703/2 |
| 2004/0059696 | A1 * | 3/2004  | Kropaczek et al. | 706/46 |
| 2005/0021486 | A1 | 1/2005 | Naveh | |
| 2006/0031444 | A1 * | 2/2006 | Drew et al. | 709/223 |
| 2006/0149512 | A1 * | 7/2006 | Kropaczek et al. | 703/2 |
| 2006/0149608 | A1 * | 7/2006 | Asgari et al. | 705/8 |
| 2007/0021998 | A1 * | 1/2007 | Laithwaite et al. | 705/9 |
| 2007/0179919 | A1 * | 8/2007 | Kropaczek et al. | 706/19 |
| 2008/0134193 | A1 * | 6/2008 | Corley et al. | 718/104 |
| 2008/0195982 | A1 * | 8/2008 | Nahir et al. | 716/2 |

OTHER PUBLICATIONS

Nonobe, Koji; Ibaraki, Toshihide; "An improved tabu search method for the weighted constraint satisfaction problem"; INFOR, vol. 39 No. 2, pp. 131-151, May 2001.*

Naveh et al., "Workforce optimization: Identification and assignment of professional workers using constraint programming", IBM Journal of Research and Development 51, 3.4, pp. 263-279, 2007.

* cited by examiner

*Primary Examiner* — Leland Marcus
(74) *Attorney, Agent, or Firm* — Daniel Kligler (57) ABSTRACT

A computer-implemented method for resource management includes storing in a memory a set of resource consumers, resources for allocation to the resource consumers, and initial binary constraints applying to the allocation of the resources. Respective variables are associated with the resource consumers, and the resources are identified as values applicable to the variables. A non-binary scoring criterion is applied to generate scores on a graded scale for proposed assignments of one or more of the resources to respective ones of the resource consumers. One or more additional binary constraints are defined based on the graded scale of the scores. An assignment is found of the values to the variables that satisfies the initial and additional binary constraints using a constraint satisfaction problem (CSP) solver running on a processor that is coupled to the memory. The resources are assigned to the resource consumers responsively to the assignment of the values to the variables.

25 Claims, 3 Drawing Sheets

EXTENDING CONSTRAINT SATISFACTION PROBLEM SOLVING

BACKGROUND

The present invention relates generally to solving constraint satisfaction problems, and specifically to methods and systems for solving such problems using systematic techniques.

Many problems that consist of complex rules, tasks, and resources are addressed by representing them as constraint satisfaction problems (CSPs). In this framework, the task is specified in terms of a set of variables, each of which can assume values in a given domain, and a set of constraints, which the variables are expected to satisfy. The set of variables and constraints is sometimes referred to as a constraint network. Each constraint may be expressed as a relation, defined over some subset of the variables, denoting valid combinations of their values. A solution to the problem is an assignment of a value to each variable from its domain that satisfies all the constraints.

SUMMARY

An embodiment of the present invention provides a computer-implemented method for resource management. The method includes storing in a memory a set of resource consumers, resources for allocation to the resource consumers, and initial binary constraints applying to the allocation of the resources. Respective variables are associated with the resource consumers, and the resources are identified as values applicable to the variables. A non-binary scoring criterion is applied to generate scores on a graded scale for proposed assignments of one or more of the resources to respective ones of the resource consumers. One or more additional binary constraints are defined based on the graded scale of the scores. An assignment is found of the values to the variables that satisfies the initial and additional binary constraints using a constraint satisfaction problem (CSP) solver running on a processor that is coupled to the memory. The resources are assigned to the resource consumers responsively to the assignment of the values to the variables.

Other embodiments provide apparatus and computer software products that operate on principles similar to this method.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION

Overview

Embodiments of the present invention that are described hereinbelow provide improved methods and systems for solving problems of resource allocation. In workforce management, for example, a workforce broker needs to assign workers (resources) to tasks. In this exemplary application, the workforce broker typically assigns professionals seeking employment to open work positions. An optimal assignment is determined by the satisfaction of many given matching rules, also known as constraints, and by application of predefined priorities establishing an ordering among feasible assignments. The principles of the present invention, however, may similarly be used in other applications of constraint programming, such as social matching systems and design verification.

Each constraint is implemented as a binary matching rule, whereby the constraint is satisfied if the condition defined by the rule is met by a resource being considered, and is unsatisfied when the converse is true. In the context of the present patent application and claims, the binary matching rules are interchangeably referred to as binary constraints. For example, a constraint may require that a distance between the location of a professional and an open work position must be less than a maximum distance, e.g. 30 miles. Some constraints are defined as high priority constraints, and the remaining constraints are delineated as low priority constraints. A predefined list is typically provided to specify, for certain constraints, which other constraints may be overridden under certain conditions, as will be described in more detail hereinbelow. High priority constraints are inviolable under most circumstances. Constraints that are not high priority are referred to as low priority constraints, and operate as preferences rather than inviolable constraints.

The predefined priorities are typically provided for by applying variable and value heuristics to establish an ordering of the constraints. When several resources meet the requirements prescribed by high priority constraints, the ordering is used to prioritize the assignment of the several resources, as described hereinbelow.

In some cases, however, a non-binary evaluation of quality may also be used to assess the resources, in the form of scoring criteria that are applied using a graded scale. The graded scale may provide a non-binary score for potential assignments of resources to tasks. In the present example, the graded scale may provide a score expressing the appropriateness of a specific professional for a certain type of open work position. The scoring criteria used with the graded scale may be generated by a human evaluator, or may be provided automatically, as described hereinbelow. As used herein, the term "graded scale" includes the scale and the scoring criteria. Other predefined priorities may also be defined in a non-binary manner. The graded scale, however, is distinguished by being used to override high priority constraints when assigning a resource to a task under certain conditions, as described hereinbelow.

Utilization of the graded scale in solving resource allocation problems presents a challenge for integration in a constraint programming framework, as each constraint within a constraint satisfaction problem (CSP) is expected to be framed as a binary matching rule, as described hereinabove. In addition, a solution is required to integrate the graded scale with the ordering of the tasks provided by the predefined priorities. A trivial solution to this problem is simply to allow the graded scale to supersede the conventional constraints and conventional task ordering, but this approach may mean, essentially, that other constraints are simply set aside.

Embodiments of the invention robustly provide a technique for balancing the use of the graded scale, the constraints, and the task ordering in solving a CSP. These embodiments benefit by ensuring utilization of expert knowledge, in addition to other uses provided by the graded scale, without sacrificing the strength provided by CSP solvers. The CSP solvers typically provide automated assignment of large numbers of resources to tasks, accounting for preferences and constraints. The embodiments also utilize the numerical value of the score provided by the graded scale.

Embodiments of the present invention supplement the constraints by converting the graded scale into supplemental constraints, or new binary matching rules. An upper confidence limit and a lower confidence limit are provided in order to provide weights for the scores developed using the graded scale. The limits are used when defining the supplemental constraints. The predefined list delineates, for each graded-scale constraint, which other constraints may be overridden as described hereinbelow.

A first supplemental constraint is defined such that a resource does not qualify for assignment to any task when application of the graded scale results in a score for the assignment that is below the lower confidence limit. A second supplemental constraint is defined such that a resource qualifies for assignment to any task whenever the application of the graded scale results in a score for the assignment that exceeds the upper confidence limit and if all of the constraints except those appearing on the predefined list are satisfied by the assignment.

Embodiments of the present invention also define a new prioritization criterion in order to indicate where the graded scale fits within the ordering. The new prioritization criterion is then added to the predefined priorities, and the ordering is refined accordingly. The resource allocation problem may then be constructed as a CSP and then solved accordingly.

The CSP is formulated mathematically as a triplet (V,D,C), wherein V is a set of variables that characterize the problem to be solved, D are the respective domains of the variables (i.e., the values that each variable may assume), and C is a set of constraints, each defined over a subset of the variables. A solution to a CSP is an assignment of a respective value to each variable that satisfies all of the constraints. CSP solvers, as are known in the art, receive and solve CSP definitions that include the variables, domains and constraints, and return a solution. Some CSP solvers also accept low-priority constraints (referred to in some cases as "soft constraints") which the solution should desirably satisfy but are not strictly required. These low priority constraints may be prioritized so that the CSP solver gives preference to solutions that satisfy high priority constraints, even if one or more low priority constraints are not satisfied.

In the case of workforce management, for example, each task to be accomplished is defined as a variable, with a domain containing the workers who may be assigned to perform each task. The constraints specify limitations on factors such as timing, location, cost and skill sets needed for the tasks. A solution to the CSP in this case typically assigns the workers so that all tasks are accomplished within the required time frame while matching worker skills to task demands and holding down the overall cost to the employer.

Systematic CSP solvers search for solutions over the entire problem space, which is defined by the Cartesian product of the variable domains. These solvers use constraint propagation to prune the search space, by filtering unsupported values from the domains of variables on which a given constraint acts. For example, assuming a certain constraint applies to the values of variables $V_1$ and $V_2$ together, and a certain value is assigned to $V_1$, the applicable constraint propagator routine will prune out the unsupported values from the domain of $V_2$, i.e., the values that are incompatible with the constraint given the assigned value of $V_1$.

Given an appropriate set of propagators for the constraints in a CSP, a systematic CSP solving algorithm typically works in stages. Each successive stage begins with a partial assignment of values to variables from the previous stage (or, at the first stage, from the initial domain definition) that is consistent, i.e., it does not violate any constraint. In each stage, two phases are applied: (1) In the instantiation phase, a trial value is assigned to one of the unassigned variables (i.e., a variable to which no specific value has yet been assigned) from its available domain. (2) In the propagation phase, the constraint propagators are used to prune out values of other variables that are now unsupported in view of the instantiated value. Pruning the domain of a given variable in this stage due to one constraint may lead, by constraint propagation, to pruning the domains of other variables that are connected to the given variable by other constraints.

This procedure continues in stages until all variables are instantiated with values that satisfy the CSP, or until it is found that no satisfying assignment exists. In the course of the procedure, however, it often occurs at some stage that after instantiating a given variable to a certain value, the domain of another variable becomes empty as the result of constraint propagation. It is then necessary to backtrack through the search, wherein the variable domains are reset to their previous values, a new value is assigned to some variable, and the constraint propagation is repeated. (Sometimes it is necessary to backtrack and repeat several stages.) CSP solvers that are known in the art offer additional subroutines and heuristics that can be used to enhance the efficiency and flexibility of constraint propagation and pruning, but these aspects of CSP solving are beyond the scope of the present invention. One CSP solver that may be used in this context is the Choco constraint programming system, which is available on the Sourceforge.net® Web site.

Alternatively, the principles of the present invention may also be implemented using stochastic CSP solvers. Such solvers are described, for example, in U.S. Patent Application Publication 2005/0021486 A1 and in the references described therein.

As noted earlier, the embodiments that are described further hereinbelow relate to the use of constraint programming in resource management: allocation of resources to resource consumers. In a specific example, the resources comprise workers, while the resource consumers are tasks. As other examples, the resources may comprise housing units, while the consumers are residents; or the resources and consumers may be male and female participants in a matchmaking service. In further alternative embodiments, the principles of the present invention may be used in test generation and design verification, as well as in other applications of constraint programming that are otherwise known in the art.

A non-binary scoring criterion may be provided by the human evaluator as an evaluation score for potential assignments using his or her expert knowledge of the resources being evaluated for the tasks. Additionally or alternatively, the non-binary scoring criterion may be provided by automatically performing a textual comparison between a first document describing at least one of the resource consumers and a second document describing at least one of the resources.

Supplementing the constraints and refining the ordering enables the graded scale to be integrated seamlessly with the application of the CSP solver to extend the ability to resolve resource allocation problems. The expert knowledge about the resource assignments inherent within the graded scale can then be utilized within the solution. Confidence limits are established to qualify the graded scale based upon beliefs about the accuracy and importance of the graded scale relative to the other constraints. As will be described hereinbelow, embodiments of the present invention provide an increase in the number of successful assignments of resources to tasks in addition to qualitative improvements in the assignments.

System Description

Figure 1:
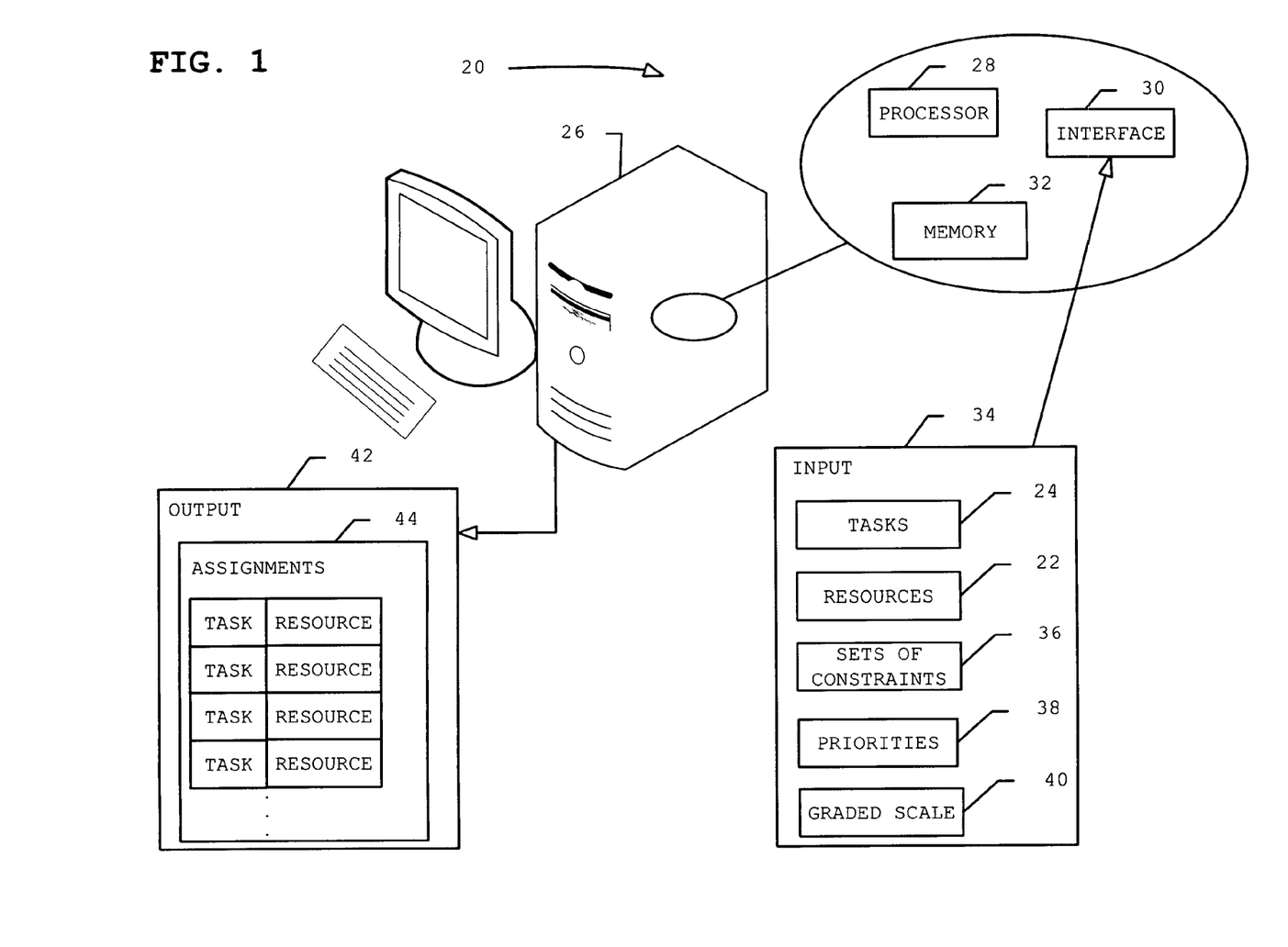
FIG. 1 is a block diagram that schematically illustrates a system for assigning resources to tasks, in accordance with an embodiment of the present invention.

FIG. 1 is a block diagram that schematically illustrates a system 20 for assigning resources to tasks, in accordance with an embodiment of the present invention. System 20 matches resources 22 to tasks 24. System 20 typically comprises a general-purpose computer 26, which is programmed in software to carry out the functions that are described herein. Computer 26 comprises a processor 28, a communications interface 30, and a memory 32, which holds data structures and information that are used in performing these functions. The software may be downloaded to computer 26 in electronic form, over a network, for example, or it may alternatively be provided on tangible media, such as optical, magnetic or electronic memory media. Further alternatively, at least some of the functions of computer 26 may be carried out by dedicated electronic logic circuits. Interface 30 may comprise a Bluetooth® adapter, an Infrared Data Association (IrDA) device, a cable connection, or any communication interface that allows computer 26 to receive input for assigning resources to tasks and to send output comprising the assignments.

For the purposes of illustration, system 20 is described using an example of a resource assignment problem typically found in workforce management. A user of the system 20, e.g., a workforce broker (not shown), may need to assign professionals seeking employment to open work positions. System 20 receives an input 34. The input 34 comprises tasks 24, resources 22, sets of constraints 36 which are implemented as binary rules, priorities 38, and a graded scale 40. As used herein, the term "graded scale" includes the scoring criteria being applied. Each of the tasks 24 has certain requirements, such as skill set and office location. Each of the resources 22, for example a professional, has certain skills, and other characteristics, such as years of experience, salary, and home location. Each of the sets of constraints 36 comprises a requirement that is intended to be satisfied for tasks 24.

Priorities 38 are input to system 20 in order to define ordering priorities or preferences, as described hereinabove. For example, one of priorities 38 may be defined to maximize the number of years of experience that the professional has in his profession. Preferences among the constraints are then used to order sets of constraints 36, so that assignments of resources 22 to tasks 24 are optimized, as described hereinbelow.

In some embodiments, graded scale 40 comprises a numerical function that provides a score for each assignment of one of resources 22 to one of tasks 24. Graded scale 40 may be defined by a human expert or may be automatically generated, as described hereinbelow. In the present example, graded scale 40 provides a score for each professional (among all of the professionals or a subset of the professionals) that rates the expected success of the professional if he or she is assigned to a certain open work position.

Computer 26 supplements the constraints by converting the graded scale into additional constraints, as described hereinbelow. Computer 26 defines a new prioritization criterion to indicate where graded scale 40 fits within the ordering of constraints. The new prioritization criterion is then included in priorities 38, and the ordering is refined accordingly, using the now augmented set of priorities. Additionally or alternatively, the new prioritization criterion may be defined and the ordering refined accordingly, with the use of operator assistance.

In the CSP addressed by system 20, tasks 24 are implemented as variables, resources 22 as values in the domains of the variables, and the task requirements, or sets of constraints 36 as binary rules. System 20 solves the CSP in order to find an assignment of values to variables that satisfies the constraints (i.e., an assignment of resources 22 to tasks 24 that satisfies sets of constraints 36). Because it performs this CSP solving function, processor 28 is also referred to herein as a "CSP solver." Processor 28 may run any suitable CSP solving algorithm for this purpose, with the addition of the one or more additional binary constraints defined based upon a graded scale of the scores that are described herein. System 20 produces output 42 comprising assignments 44 of resources 22 to tasks 24.

Graded Scale

Figure 2:
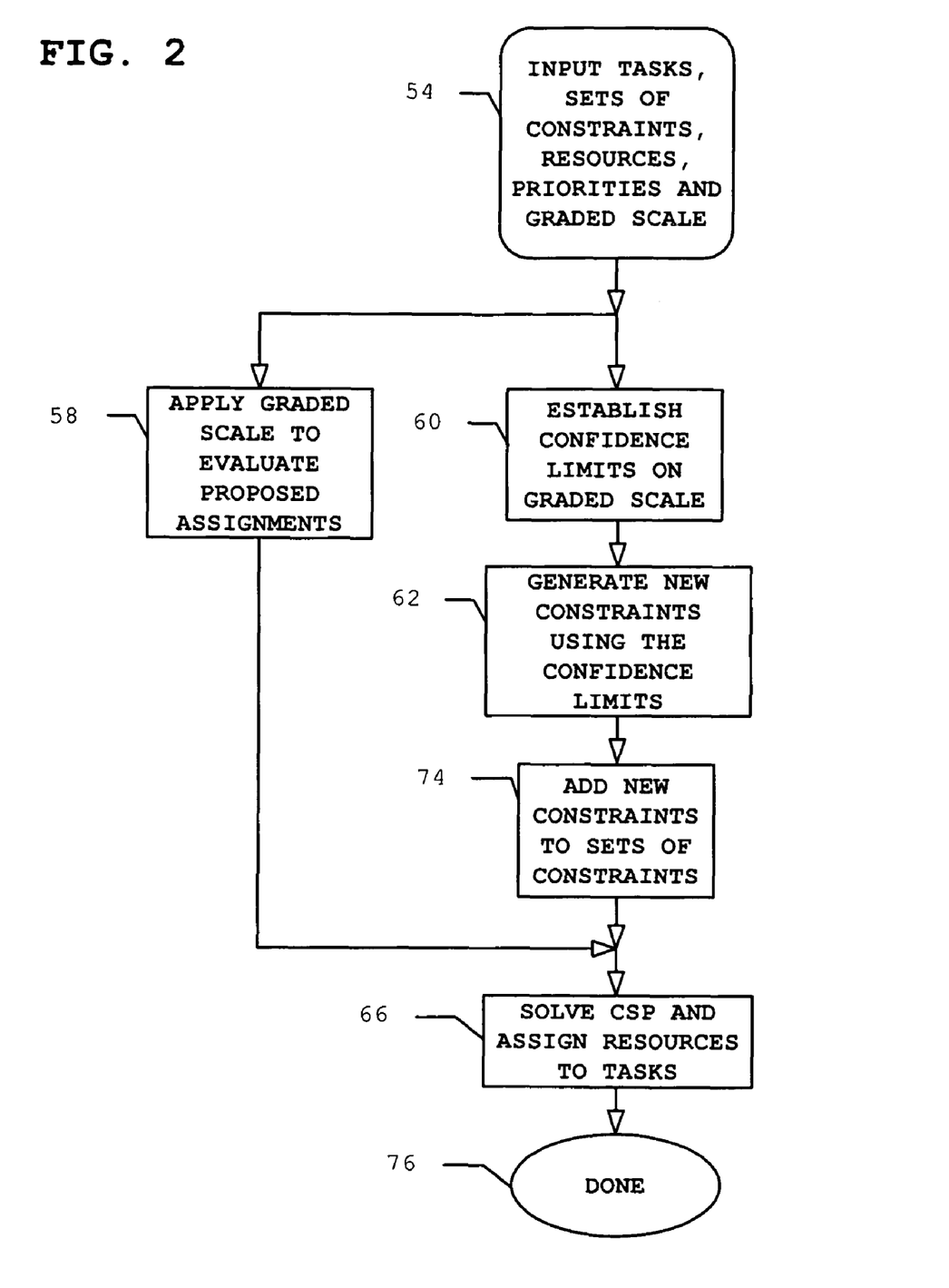
FIG. 2 is a flow chart that schematically illustrates a method for assigning resources to tasks, in accordance with an embodiment of the present invention.

FIG. 2 is a flow chart that schematically illustrates a method for assigning resources to tasks, in accordance with an embodiment of the present invention. Tasks 24, resources 22, priorities 38, sets of constraints 36 and graded scale 40 are input to computer 26, in an input step 54.

Computer 26 applies graded scale 40 to evaluate resources 22, in a graded scale application step 58. As noted above, graded scale 40 may be a function that accepts proposed task-resource assignments and outputs non-binary values in the form of a numeric score. For example, graded scale 40 may grade expected performance quality of each of resources 22 in a given task. Graded scale 40 may be provided automatically or manually. Graded scale 40 typically expresses expert knowledge for use in assignment of resources 22 to tasks 24 and can be introduced automatically or with operator assistance.

In an example of applying graded scale 40 to resources 22, a score may be assigned to compatibility of professionals seeking employment with open work positions. An exemplary list of professionals associated curricula vitae (CVs), and descriptive text, the latter derived from their CVs, is given in Table 1.

TABLE 1

| Professionals and curricula vitae text | |
|---|---|
| Professional 1 | COBOL programmer, database architect, graphics designer, logo specialist . . . |
| Professional 2 | Product management professional, wrote specifications for legacy replacement systems, client features . . . |
| Professional 3 | Graphical User Interface designer, icon illustrator, use case expert, 10 years spent . . . |
| Professional 4 | Java guru, C#, Team Leader, designed 3 tier system architecture for financial institution, RDBMS and SQL expert . . . |
| . . . | . . . |

A set of open work positions may comprise written job descriptions. An exemplary list of open work positions and extracts indicating required skills is given in Table 2.

TABLE 2

Open work positions and required skills

| | |
|---|---|
| Development Team Leader | Must have 5 years of team management background, including Java, C++, SQL and 3 tier architecture expertise a . . . |
| Product Manager | Candidate should have worked on product life cycle in Fortune 100 company, focusing upon client business requirements and converting them to technical specifications . . . |
| Usability Expert | Front end designer needed. Must have Adobe ® Photoshop ® expertise, experience with usability heuristic application techniques, minimum 8 years . . . |
| . . . | . . . |

Information retrieval techniques may be used to assign a score for the fit of each professional to each open work position. The text of the required skills for each open work position may be extracted and stored in a database. The CVs may also be stored in a similar fashion. The CVs may be indexed using a Lucene open source information retrieval library (available at the web site of the Apache Software Foundation, lucene.apache.org). Lucene provides a cross-platform full text indexing and searching capability. Text from many document formats can be indexed (such as CVs of professionals seeking employment in the present example), and full text searches may be conducted to provide search results. Other full text indexing and searching engines may be used, or alternative methods known in the art may be used to index the CVs and to provide document searching capabilities.

Lucene provides "hits" in response to a search term when matching the term to documents in the index, and the quality of each hit is rated with a score. In order to determine how well a CV matches open work positions, a query is sent to Lucene using all of the words in the required skills field for an open work position as search terms, with common English words removed. The search is performed using the search terms without requiring any or all of the search terms to be found in the results.

A relatively high-scoring match, for example a score of 0.6, may be received for the curriculum vitae (CV) of "Professional 4" from the example in Table 1, when searching using the required skills text of the "Development Team Leader" position from the example in Table 2. The significant overlap between the text of the required skills for the work position and the text of Professional 4's CV causes Lucene to score the search result accordingly. In the example, a significantly lower score of 0.2. may be received for the CV of "Professional 2" from Table 1, due to the lack of overlap between text of his CV and the required skills text for the Development Team Leader position.

In the current example, the accuracy of graded scale 40 may be increased using specialized refinement techniques for the scoring. The score of rare words that overlap between the CV and the required skills for the position can be increased, while the scoring of common words can be decreased, using techniques known in the art. Additionally or alternatively, scoring can be increased for overlapping words that have been determined to be relevant to a specific task. For example, scoring for open work positions in technical fields may be increased for words that delineate specific technical skills. The score received in response to the query provides a measurement of how well each of the CVs fits each of the open work positions. In general terms, graded scale 40 provides scores for evaluating resources 22.

Alternatively or additionally, the graded scale evaluation may be provided from other sources, including both automated and human-generated evaluations. For example, an operator or user of system 20 may manually rate one or more of the candidates in Table 1 with regard to their suitability for one or more of the work positions in Table 2. A manager who is familiar with Professional 3's work on a previous project, for instance, may input a job appropriateness score of 8 on a scale of 0-10 with respect to the "Usability Expert" job in Table 2, independently of any sort of automatic evaluation of Professional 3's CV or other input.

Confidence limits are provided to estimate accuracy of graded scale 40 in a graded scale accuracy estimating step 60. Accuracy estimating step 60 may be performed in parallel with application step 58, or sequentially. The use of these confidence limits in deriving constraints from the graded scale results is described hereinbelow.

Figure 3:
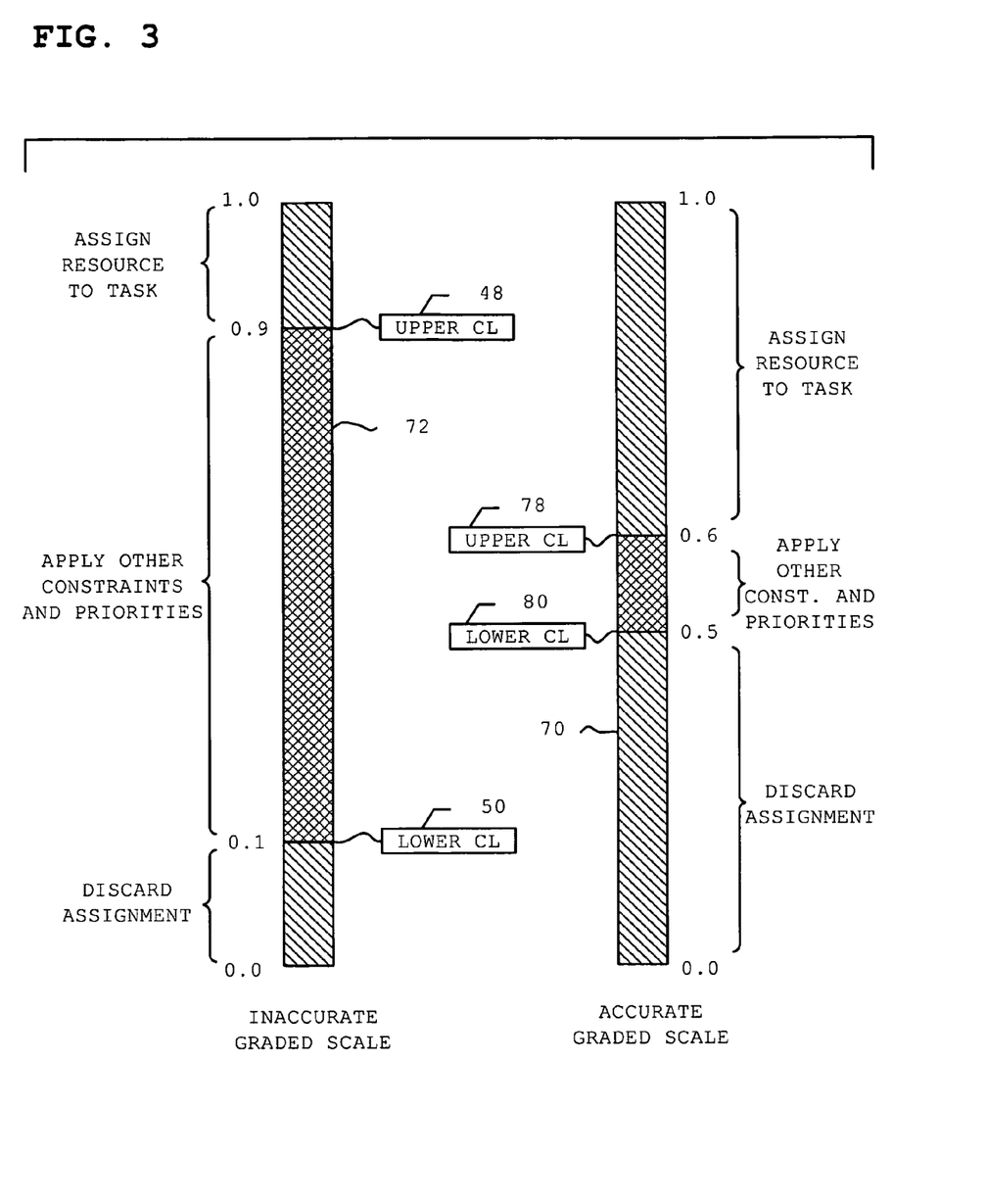
FIG. 3 is an illustration that schematically demonstrates application of confidence limits to a graded scale, in accordance with an embodiment of the present invention.

Reference is now made to FIG. 3, which is an illustration that schematically demonstrates application of confidence limits to a graded scale, in accordance with an embodiment of the present invention. Upper confidence limits 48, 78 and lower confidence limits 50, 80 are established to represent a belief about the accuracy and relative importance of graded scale 40 in comparison with priorities 38 in determining the appropriateness of a given resource to a given task. Two examples of graded scale 40 are shown, both providing scores having values between 0 and 1. For example, when a graded scale 70 is deemed to be accurate, as on the right side of FIG. 3, limits 78 and 80 will be configured to have values that are relatively close to each other. In accurate graded scale 70 the upper confidence limit 78 is assigned the value 0.6, and lower confidence limit 80 is assigned the relatively close value 0.5. An accurate graded scale strongly influences the determination of assignments 44 made by the CSP solver as described hereinbelow.

Alternatively, if there is a low degree of confidence in the accuracy of a graded scale 72, upper confidence limit 48 will be configured with a high value, and lower confidence limit 50 will be configured to have a low value. In inaccurate graded scale 72, upper confidence limit 48 is configured to have the value 0.9, and lower confidence limit 50 is configured to have the value 0.1. An inaccurate graded scale weakly influences the determination of assignments 44 made by computer 26 as described hereinbelow.

Returning to FIG. 2, two new constraints (new binary rules) are generated that define conditions for use of the scores generated by graded scale 40 using the confidence limits in a new constraint generating step 62. The first new constraint excludes resources 22 from being assigned to tasks 24 when the score obtained from graded scale 40 for the proposed task-resource assignment is below the lower confidence limit.

The second new constraint causes resources 22 to be assigned to tasks 24 when the score generated by graded scale 40 for the proposed task-resource assignment is above the upper confidence limit and if all of the constraints except those appearing on a predefined list are satisfied by the assignment. The system administrator or user of system 20 may define in advance, for each graded-scale constraint, which other constraints are high priority constraints and which are low priority constraints. For example, it may be a high priority constraint that the professional have a minimum number of years of experience in a previous work position. A maximum distance between the residence of the professional and an open work position may be designated as a low priority constraint. Thus, when the score from graded scale 40 exceeds the upper confidence limit for an example task-resource assignment, and the number of years of experience in the previous work position for the professional is greater than the mandatory minimum, the professional may be assigned to the work position, despite living farther from the work position than the specified maximum distance. Typically, when the graded-scale score is believed to be accurate, the accompanying list of low priority constraints will be long, thus permitting a high score to override other constraints. A score that is believed to be inaccurate will concomitantly have only a short list (or empty list) of low priority constraints.

In addition, a prioritization criterion is added for use by the solver in ranking task-resource assignments according to their scores on the graded scale. This criterion specifies that when other constraints are satisfied, a task-resource match with a higher score will be preferred by the CSP solver over another match with a lower score. The prioritization criterion then indicates the order of importance of the graded scale score relative to other prioritization criteria, in terms of priority for being satisfied by the CSP solution. Thus, a graded-scale score that is considered to be accurate can be given a high priority.

Computer 26 adds the new constraints to sets of constraints 36 in a new constraint adding step 74 to create respective supersets of constraints.

Returning to FIG. 3, the first new constraint disqualifies resources having scores for proposed task-resource assignments below lower confidence limit 50 or 80. Thus, when using inaccurate graded scale 72, task-resource assignments having a score below the value 0.1 are rejected.

The second new constraint requires that proposed task-resource assignments be accepted if the resources have scores above upper confidence limit 48 or 78 and all of the constraints except for those appearing on the predefined list are satisfied by the assignment. That is to say, when using accurate graded scale 70, resources having a score exceeding a value of 0.6 are accepted as long as the appropriate high priority constraints are satisfied.

When resources have scores for proposed task-resource assignments in the intermediate range between lower confidence limit 50 or 80 and upper confidence limit 48 or 78, sets of constraints 36 (FIG. 1) and priorities 38 are utilized by the CSP solver in conjunction with the ranking of resource scores on the graded scale. If the graded scale has high priority, then these scores in the intermediate range will have dominant importance among other prioritization criteria. Otherwise, if the graded scale has low priority, the scores in the intermediate range will largely be ignored.

When the sets of tasks and resources are large, the number of pairs in the Cartesian cross-product space of variables and values can become very large, and the list of graded-scale scores may be difficult to produce and maintain. Set and wildcard notations may then be used to express identical scores for many pairs simultaneously. For example, (a1,b1;b2;b3;b4):0.08 defines a score of 0.08 for all four (task, resource) pairs (a1,b1), (a1,b2), (a1,b3), (a1,b4). Similarly, (a1,*):0.12 gives a score of 0.12 to all pairs consisting of a1 and any member of the set of resources B. In cases of conflict between scores on the same pair, the most smallest set in the definition of pairs defines the score (so that in this example, (a1,b1) has a score of 0.08, not 0.12). In cases in which there is not a subset-relation, such as the sets of scores (a1;a2,b1;b2):1.5 and (a1;a3,b1;b3):2.0, various approaches can be taken for evaluating the score (a1, b1), such as taking the minimal or maximal value, or disallowing such scores.

The CSP presented by the tasks, resources and respective supersets of constraints is solved by the CSP solver, in a CSP solving step 66. As is known in the art, a solution of a CSP implies that respective values, satisfying the applicable constraints, have been assigned to all the variables (or at least to as many of the variables as possible when a satisfying assignment for all the variables cannot be found).

In specific terms of the workforce management example described above, a solution generally entails that professionals have been assigned to fill a maximum number of open work positions. In some workforce management applications, solving the CSP using the methods described herein has resulted in 15-20% more successful assignments 44 than conventional CSP solutions.

Using conventional CSP solving techniques, false positive assignments are often received wherein the CSP solver outputs assignments of multiple professionals to an open work position, but some of the professionals are in fact not a good fit for the position. In one example, five professionals were designated for potential assignment to an exemplary position. Only two of the professionals were deemed to be suitable for the position. Upon application of methods described above, the CSP solver correctly assigned the two suitable professionals to the position, eliminating the false positive assignments.

The method then terminates at a final step 76.

Example

In this prospective example, a workforce broker needs to assign professionals seeking employment to an open work position. For the sake of simplicity, one high priority constraint and one low priority constraint are given in table 5 hereinbelow.

A list of professionals, travel distances for the professionals between their home location and the work position location, pay rates, the open work position, and scores generated by a graded scale for the proposed task-resource assignment, is given in Table 3.

TABLE 3

Professionals, characteristics, proposed task-resource assignments, and scores

| Name | Distance | Pay Rate | Job Title | Score |
| --- | --- | --- | --- | --- |
| Professional 1 | 20 miles | $115,000 | Development Team Leader | 0.7 |
| Professional 2 | 80 miles | $65,000 | Development Team Leader | 0.2 |
| Professional 3 | 40 miles | $72,000 | Development team Leader | 0.1 |
| ... | | | ... | |

A list of confidence limits estimating the accuracy of the graded scale is given in Table 4.

TABLE 4

Confidence limits

| Upper confidence limit | 0.6 |
| --- | --- |
| Lower confidence limit | 0.5 |

A list of constraints is given in table 5.

TABLE 5

Constraints

| Development Team Leader | Low Priority | Pay rate <$100,000 |
| --- | --- | --- |
| Development Team Leader | High Priority | Longest travel distance <100 miles |

A proposed assignment of Professional 2 (Table 3) to the Development Team Leader position is discarded due to his score having the value 0.2, which is less than 0.5.

A proposed assignment of Professional 1 (Table 3) to the Development Team Leader position is successful. The assignment succeeds since Professional 1's score has the value 0.7, which is higher than the upper confidence limit of 0.6 (Table 3), The high priority constraint is satisfied: his longest travel distance is less than the maximum allowed (Table 5).

In addition to the applications described above, constraint satisfaction methods have also been found useful in a variety of other applications, including:

Artificial intelligence
Robotic control
Temporal reasoning
Natural language parsing
Spatial reasoning
Test generation for software and hardware systems
Machine vision
Medical diagnosis
Crew scheduling
Time tabling
Frequency allocation
Graph coloring.

The principles of the present invention may also be applied in other applications of constraint programming, such as those listed above.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code stored in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RE, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flow chart illustrations and/or block diagrams of methods, apparatus (systems) and computer program products according to embodiments of the invention. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow charts and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flow charts and/or block diagram block or blocks.

The flow charts and block diagrams in the Figures illustrate the architecture, functionality, and operation of possible implementations of systems, methods and computer program products according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustrations, and combinations of blocks in the block diagrams and/or flow chart illustrations, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A computer-implemented method for resource management, comprising:
    storing in a memory a set of resource consumers, resources for allocation to the resource consumers, and initial binary constraints applying to the allocation of the resources;
    associating respective variables with the resource consumers, and identifying the resources as values applicable to the variables;
    receiving evaluation scores on a graded scale expressing expert knowledge regarding the resources based on a non-binary scoring criterion for proposed assignments of one or more of the resources to respective ones of the resource consumers;
    defining one or more additional binary constraints based on the graded scale of the scores;
    automatically finding an assignment of the values to the variables that satisfies the initial and additional binary constraints using a constraint satisfaction problem (CSP) solver running on a processor coupled to the memory; and
    assigning the resources to the resource consumers responsively to the assignment of the values to the variables.

2. The method according to claim 1, wherein defining the one or more additional binary constraints comprises establishing an upper limit and a lower limit on the graded scale, and specifying the one or more additional binary constraints responsively to a comparison of the scores to the upper limit and the lower limit.

3. The method according to claim 2, wherein specifying the one or more additional binary constraints comprises disregarding the scores that indicate a level of confidence below the lower limit.

4. The method according to claim 2, wherein specifying the one or more additional binary constraints comprises identifying a portion of the initial binary constraints as high priority constraints, and automatically accepting the assignment of a value to a variable that satisfies the high priority and has a score on the graded scale that indicates a level of confidence that exceeds the upper limit.

5. The method according to claim 1, wherein automatically finding the assignment comprises giving preference to a first assignment over a second assignment, both of which satisfy the initial binary constraints, responsively to the scores respectively associated with the first and second assignments.

6. The method according to claim 5, wherein the initial binary constraints comprise low priority constraints having respective priorities, and wherein defining the one or more additional binary constraints comprises assigning a respective priority to the preference given responsively to the scores, and wherein automatically finding the assignment comprises solving the CSP responsively to the respective priorities.

7. The method according to claim 1, wherein receiving the evaluation scores comprises applying, by the processor, an evaluation score received by the processor from a human evaluator.

8. The method according to claim 1, wherein receiving the evaluation scores comprises automatically performing a textual comparison between a first document describing at least one of the resource consumers and a second document describing at least one of the resources.

9. The method according to claim 1, wherein the resource consumers comprise tasks, and the resources comprises workers having respective skills, and wherein assigning the resources comprises assigning the workers to perform the tasks responsively to skills of the workers.

10. Apparatus for resource management, comprising:
    a memory, which is configured to store a definition of a set of resource consumers, resources for allocation to the resource consumers, and initial binary constraints applying to the allocation of the resources; and
    a processor which is configured to associate respective variables with the resource consumers, and to identify the resources as values applicable to the variables, and to receive evaluation scores on a graded scale expressing expert knowledge regarding the resources based on a non-binary scoring criterion for proposed assignments of one or more of the resources to respective ones of the resource consumers, and to define one or more additional binary constraints based on the graded scale of the scores, and to automatically find an assignment of the values to the variables that satisfies the initial and additional binary constraints, and to assign the resources to the resource consumers responsively to the assignment of the values to the variables.

11. The apparatus according to claim 10, wherein the one or more additional binary constraints are defined by establishing an upper limit and a lower limit on the graded scale and comparing of the scores to the upper limit and the lower limit.

12. The apparatus according to claim 11, wherein one of the additional binary constraints specifies that the scores that indicate a level of confidence below the lower limit are to be disregarded.

13. The apparatus according to claim 11, wherein one of the additional binary constraints specifies that a portion of the initial binary constraints are high priority constraints, and that the assignment of a value to a variable that satisfies the high priority constraints and has a score on the graded scale that indicates a level of confidence that exceeds the upper limit is to be automatically accepted.

14. The apparatus according to claim 10, wherein the processor is configured to give preference to a first assignment over a second assignment, both of which satisfy the initial binary constraints, responsively to the scores respectively associated with the first and second assignments.

15. The apparatus according to claim 14, wherein the initial binary constraints comprise low priority constraints having respective priorities, and wherein a respective priority is assigned to the preference given responsively to the scores, and wherein the processor is configured to automatically find the assignment by solving the CSP responsively to the respective priorities.

16. The apparatus according to claim 10, wherein the non-binary scoring criterion is based on an evaluation score received by the processor from a human evaluator.

17. The apparatus according to claim 10, wherein the non-binary scoring criterion is based on automatically performing a textual comparison between a first document describing at least one of the resource consumers and a second document describing at least one of the resources.

18. The apparatus according to claim 10, wherein the resource consumers comprise tasks, and the resources comprise workers having respective skills, and the processor is configured to assign the workers to perform the tasks responsively to the skills of the workers.

19. A computer software product, comprising a durable computer-readable medium in which program instructions are stored, which instructions, when read by a computer, cause the computer to define a set of resource consumers, resources for allocation to the resource consumers, and initial binary constraints applying to the allocation of the resources, and to associate respective variables with the resource consumers, and identify the resources as values applicable to the variables, and to receive evaluation scores on a graded scale expressing expert knowledge regarding the resources based on a non-binary scoring criterion for proposed assignments of one or more of the resources to respective ones of the resource consumers, and to define one or more additional binary constraints based on the graded scale of the scores, and to automatically find an assignment of the values to the variables that satisfies the initial and additional binary constraints using a constraint satisfaction problem (CSP) solver running on the computer, and assign the resources to the resource consumers responsively to the assignment of the values to the variables.

20. The product according to claim 19, wherein the one or more additional binary constraints are defined by establishing an upper limit and a lower limit on the graded scale and comparing of the scores to the upper limit and the lower limit.

21. The product according to claim 20, wherein one of the additional binary constraints specifies that the scores that indicate a level of confidence below the lower limit are to be disregarded.

22. The computer software product according to claim 20, wherein one of the additional binary constraints specifies that a portion of the initial binary constraints are high priority constraints, and that the assignment of a value to a variable that satisfies the high priority constraints and has a score on the graded scale that indicates a level of confidence that exceeds the upper limit is to be automatically accepted.

23. The computer software product according to claim 19, wherein the instructions cause the computer to give preference to a first assignment over a second assignment, both of which satisfy the initial binary constraints, responsively to the scores respectively associated with the first and second assignments.

24. The computer software product according to claim 23, wherein the initial binary constraints comprise low priority constraints having respective priorities, and wherein a respective priority is assigned to the preference given responsively to the scores, and wherein the instructions cause the computer to automatically find the assignment by solving the CSP responsively to the respective priorities.

25. The computer software product according to claim 19, wherein the non-binary scoring criterion is based on an evaluation score received by the computer from a human evaluator.

* * * * *